Dec. 12, 1944.  D. K. WARNER  2,364,676
SKIMMING AND FLYING VEHICLE
Filed May 22, 1940  3 Sheets-Sheet 1

Inventor
Douglas K. Warner

Dec. 12, 1944. D. K. WARNER 2,364,676
SKIMMING AND FLYING VEHICLE
Filed May 22, 1940 3 Sheets-Sheet 2
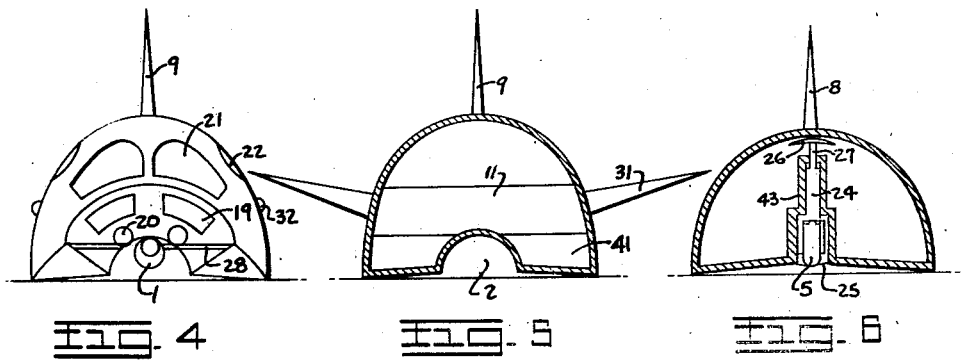
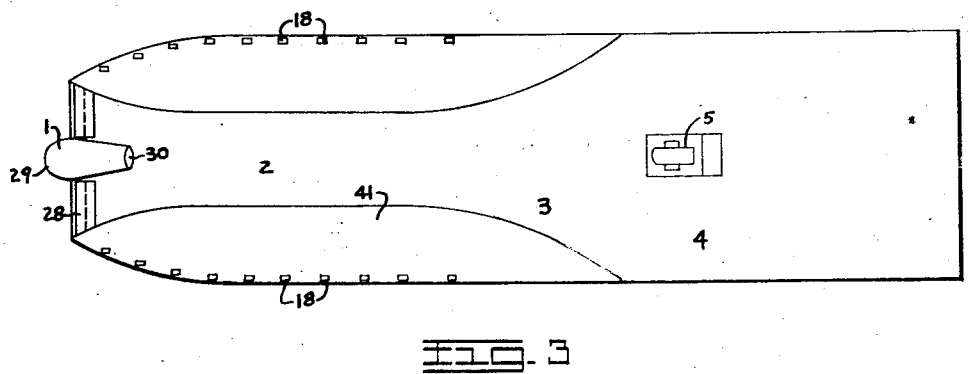
Inventor
Douglas K. Warner Dec. 12, 1944.  D. K. WARNER  2,364,676
SKIMMING AND FLYING VEHICLE
Filed May 22, 1940  3 Sheets-Sheet 3
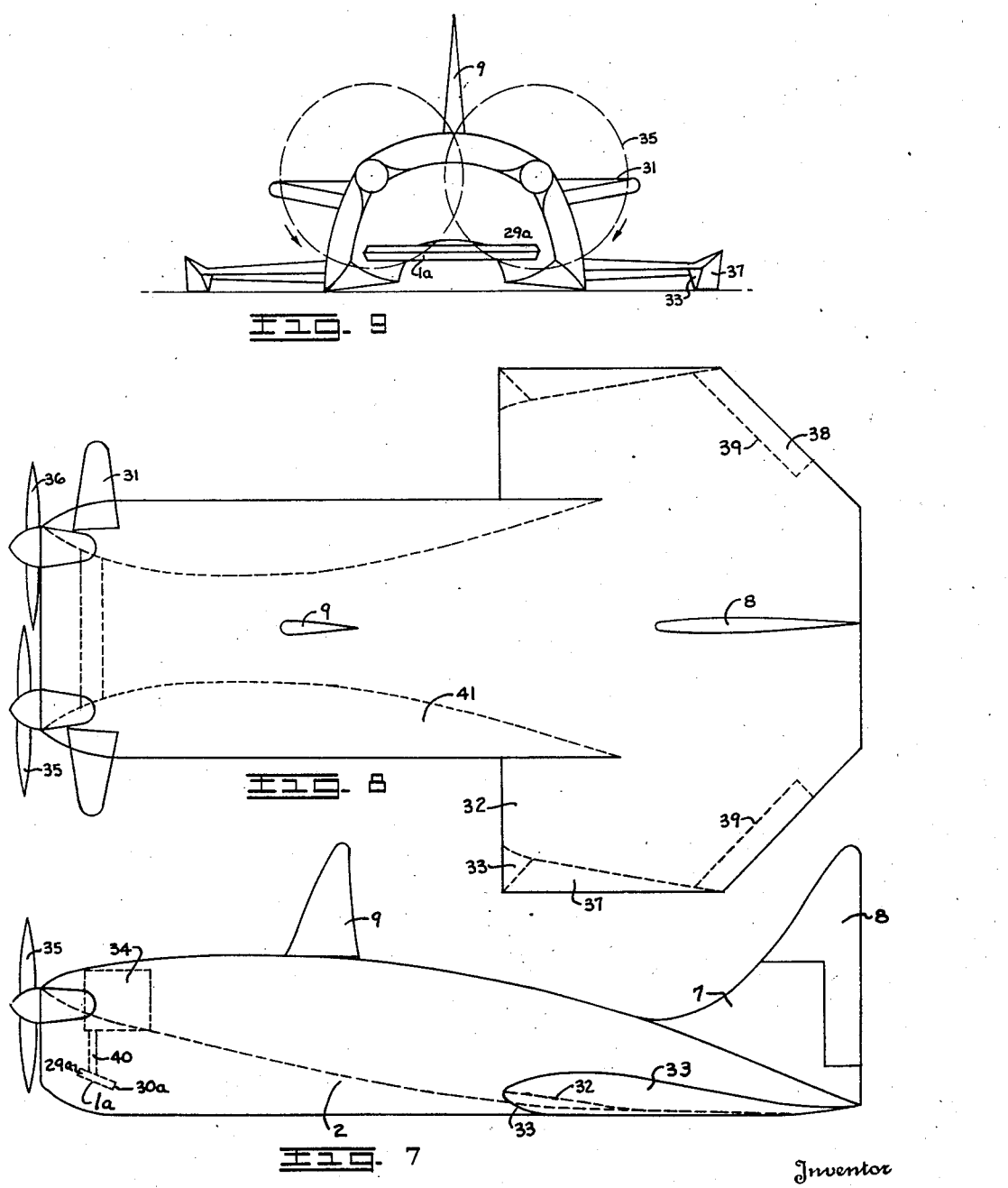
Inventor
Douglas K. Warner Patented Dec. 12, 1944

2,364,676

UNITED STATES PATENT OFFICE 2,364,676

SKIMMING AND FLYING VEHICLE

Douglas K. Warner, Sarasota, Fla.

Application May 22, 1940, Serial No. 336,545

18 Claims. (Cl. 244—15)

This invention relates to aircraft, particularly to skimming and flying vehicles, and in its specific embodiment herein disclosed, to such a vehicle adapted for amphibious use, one capable of being propelled and driven on land, on sea or river close to the surface, or at high altitudes in free flying as an airplane at highest known speeds attainable.

The primary objects of my invention are: first, to produce such an aircraft or vehicle which may be launched or taken off readily from any land or water surface or deck of an aircraft carrier, and sustained at very low or very high or varying altitudes, whatever the class, character or more immediate purpose of the plane or vehicle may be; second, to supply the requisite air-support, lift, and sustention economically as to both power and fuel employed, and weight, cost, relative absence of resistance; third, to provide this in a manner which will be effective over rough water, near ground, or in rarefied air, while yet the means and power engaged in such sustention may be more than usually effectively employed in swift propulsion of the vehicle, and in the carrying of considerable loads either of commercial freight or bombs; fourth, to provide such a vehicle which can be useful as an all-purpose campaign amphibian in time of war, and as a family traveling home or camping expedient of especially light and swift construction, or a commercial touring, demonstration, sales and delivery vehicle; fifth, to provide a vehicle which will be stable longitudinally, laterally and in yaw, either when near to or remote from a land or water surface; sixth, to provide such a vehicle which can be landed in short distances, with ease and safety; seventh, to enable take-off from fields and bays of restricted length; eighth, to permit easy turning of the vehicle whether on land, as on field or roadway, or on any other surface; ninth, to provide such a vehicle which in any of its embodiments or special purposes, will constitute a standard or model capable of replacing advantageously the previous forms and designs of bodies or hulls and their past or existing arrangements and relations of propulsive power and the direction thereof in combination and adaptation thereto; tenth, to provide special means to eject or dump bombs or the like material instantly in flight; and finally to produce such a vehicle which will do all this and be so cheap and simple in construction that they may be mass-manufactured at a price which will permit the immediate production of hundreds of thousands of them for war, and later place them within the reach of the millions of citizens.

With these and other subordinate objects in view, my invention consists in the novel features, devices, structure, combinations and arrangements of parts as will be hereinafter fully shown and described; and it further especially consists, among such features, of an entirely and generically new means of applying engine power to such a vehicle whereby a revolutionary and almost incredible result is obtained in supplying a compressed-air cushion beneath the vehicle, with consequent instant effects from the moment of gunning the engines, in creating an unusual lift upon the craft from beneath, in sustaining it in flight, and in attainment of high speed in proportion to the size, power, and gas-consumption of the engines; and in an equally new form of body which will respond to this especial power application without unmanageability, instability, or other difficulties apt to accrue from this power and lift.

In the accompanying drawings forming part of this specification, in which like reference numerals indicate like parts in the various views:

Figure 3 is a bottom plan view thereof.

Figure 4 is a front elevation of the vehicle.

Figure 5 is a cross-section on the line 5—5 of Figure 2.

Figure 6 is a cross-section on the line 6—6 of Figure 2.

Figure 7 is a side elevation of the vehicle modified by certain additions.

Figure 8 is a top plan view of the same device.

Figure 9 is a front elevation thereof.

Figure 2:
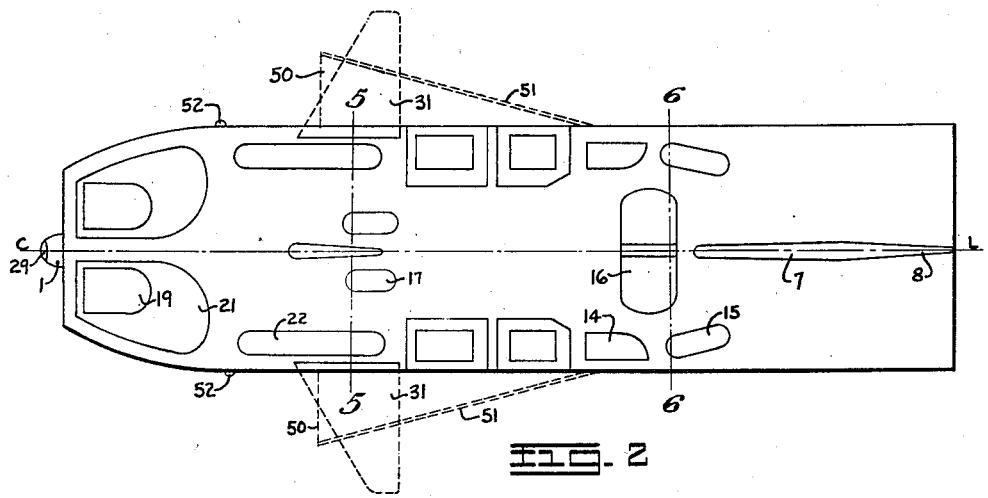
Figure 2 is a top plan view thereof.

The first six figures of the drawings, contained in Sheets One and Two, represent a plane without wings, designed for skimming and for land driving, with possibly heavy loads; while Figures 7 to 9 on Sheet Three show the same type of vehicle with wings added to permit free flight at all altitudes, and also showing in these last three figures certain additional propellers.

Referring first to the form on Sheet One, in constructing my invention in the embodiment indicated in the drawings, I build a body somewhat of the size of an ordinary touring automobile of the sedan type, of perhaps twenty two feet long, six feet wide, and four feet high, though both the size and the proportions will in practice vary according to the requirements and special purposes in view. This body is hollow, a shell-like metallic or other frame enclosed throughout, except for doors 12 and 13 for entrance and exit, located adjacent to seats 10 and 11, which I make wide enough to be used as beds or couches; and windows 21 and 22 are set in the forward portion or cabin-space of the vehicle in front of the seat 11.

The general form of the body follows the lines of a streamlined airfoil designed on the best aerodynamic principles, cambered upwardly and rearwardly from its leading edge to a point approximately at or near the rear end of the window 22, in front of the door 13, though there is no relation between that point and these adjuncts, and thence curves downwardly and rearwardly to the trailing edge of the vehicle. Both the leading edge and the trailing edge are narrowed and rounded, the first ranging quite far above the floor, and the ground or other resting surface, and the last almost at and slightly above the said surface.

Figure 1:
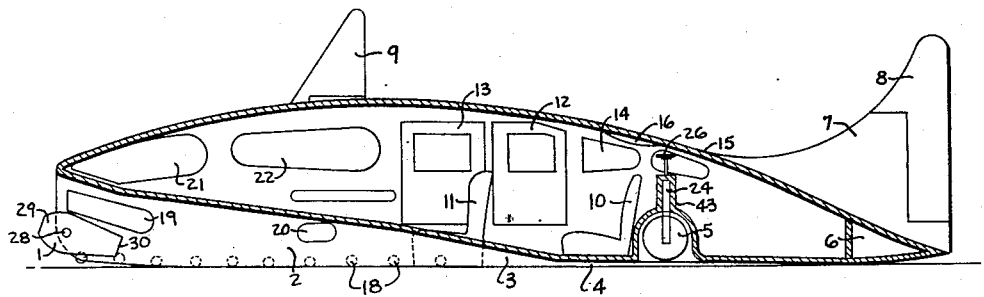
Figure 1 is a side sectional view, in longitudinal central section, of a vehicle embodying my invention.

The floor of the car-body, which is also the under flying surface of the plane, or skimming surface of the vehicle, is correspondingly quite well-upraised at front, as shown in Figures 1 and 4, and centrally concaved to form a compression-chamber beneath the body, which gradually diminishes in height rearwardly until its rear end 3 merges with the practically flat or level floor and under surface 4 as shown in Figure 1.

The longitudinally concaved compression-chamber 2 is bordered on either side by pontoons 41, which along most of their length are equally spaced apart, but are flared outwardly and forwardly to meet the likewise forwardly inclined sides of the vehicle body, which slant inwardly to the leading edge of the vehicle. For a portion of their length, the pontoons are flared outwardly at the rear to the sides of the vehicle body, as shown in Figure 3. The pontoons are not only inclined in the manner and directions described, but also at the front of the vehicle, and along the entire length of the said pontoons, the under surface of each is inclined upwardly from the outer sides thereof to the inner edges. This under-surface inclination is continued in the floor of the vehicle beyond the termination of the pontoons and almost to the trailing edge of the body, as indicated in Figure 1, and even better in Figure 6.

At the leading edge of the plane or vehicle I mount a jet propulsion device 1, which is indicated diagrammatically, and represents an internal combustion engine, a high pressure blower, and other accessories, none of which are necessary to show in detail, as they are well-known in the art, and may be selected according to the size of the device and other factors. The housing in which they are represented, is shaped in the manner of a nozzle or jet-propelling ejector of which the exit is at the narrowed end depicted at the rear in Figure 1. This power device is mounted upon a pivot or axle 28, whereby it is enabled to be turned around to direct this jet-end forwardly instead of rearwardly. Its position is, as shown, set at an angle downwardly, away from the bottom of the vehicle, with the intention that its stream and force do not play against that bottom. The rotation of the jet is intended to be under the control of the pilot of the vehicle, but neither in this connection or in other features of operation by the driver, do I show the actual levers, instruments and the like, none of these forming any part of my invention.

Toward the rear of the vehicle there is located a main wheel 5, vertically mounted to be rotatable upon a piston 24 working in a fluid-filled cylinder 43, and protruding upwardly therethrough is a shaft 27, having a steering-wheel thereon, which may be turned manually or by any intermediate mechanism of remote control. The body of the vehicle is formed into a cavity or casing around this wheel 5 to house the same, and automatic trap-doors 25 lie beneath it to close up this cavity when the wheel 5 is up. The said wheel is depressible in its cylinder for purpose which will hereafter appear in describing the operation of my invention. In addition to this main wheel, the pontoons 41 carry on each side of the vehicle roller-wheels 18, of any desired number and size, which support the forward portion of the vehicle when it is at rest upon a surface, and when held off the ground in low skimming, one or more of the roller-wheels 18 may contact the near surface if it is rough or unequal.

The body of the vehicle in front elevation or in cross-section is somewhat in the form of a semi-cylindrical figure prolonged downwardly, or cylindrical with one side of it, the lower, flattened out and then concaved to form the compression-chamber 2. On this outside I affix or establish such exterior factors of stabilization and steerage, or empennage, as are needed in the novel construction of my skimming and flying vehicle, and which I have devised to counterbalance and fulfill the requirements of a wholly new vehicle in which a forward compression-chamber with rearward pressure lift, presents a new condition of potential instabilities and factors which must be met. In the first place, I offset this new condition by constructing a fuel chamber 6 of adequate capacity in the extreme tail of the plane, the weight of which will be serviceable as hereinafter brought out. Immediately above this ballast-chamber 6 I affix a large fin 7, with rudder 8, both of which tend upwardly and rearwardly on a vertically rising arced edge, as shown in Figure 1. Forwardly I arrange empty fuel tanks in each pontoon 41, the same not being shown, as they may constitute any part or all of said pontoons, or be placed therein as desired. At either side of these pontoons, above the level of the same, I set in or on the vehicle-body ailerons 31, of rounded-vertexed right-triangular shape, with the diagonals ranging rearwardly. These ailerons as shown, are retractable within the body of the vehicle. Seen in front elevation, as indicated in Figures 5 and 9, they may also be outwardly directed at an upward incline. Above these ailerons 31 and in line with the fin 7 and rudder 8, is a forward rudder 9, set forward of the centre of gravity of the vehicle, but a distance back of the ailerons 31.

When the vehicle is intended for free flying at varyingly high altitudes, often at considerable speed, I affix or form integrally with the main body or fuselage, wing-sections 32, which preferably, as shown in Figure 8, project laterally at substantially a right angle from the body of the vehicle, thence range back at a right angle as seen in top plan, and finally incline rearwardly to a common trailing edge with that of the main body or fuselage. From a front view, these wings are shallow, taper outwardly toward a narrowed edge, on which are mounted longitudinal fins or wing-tips 33, projecting upwardly at a dihedral angle, and having their under projecting inner faces tapered rearwardly as indicated in front elevation of Figure 9 and best in dotted line in Figure 8, while their outer edges 37 are similarly tapered outwardly and rearwardly and then follow the lines of the rear inclined edges 38 of the wings 32 in the form of extension-fins or wing-tips 39, as shown in dotted lines in Figure 8. These fins 33 are not however, intended as runners for the vehicle, which is a function of the under surfaces of the pontoons 41 in supporting the fuselage in such manner as to leave the inner tapered edges of the pontoons off the ground or other surface.

If I make the plane shown in Figures 7 to 9 exceptionally sizable, heavy, or capacious, and high-powered, I mount beneath its leading edge, within the compression-chamber 2, an air-foil 1a, in which are placed a number of engines, instead of the one indicated in Figure 1, although even in the lightest specimen of my vehicle I may favor using multiple engines, each small but multi-cylindered, preferably radial-cylindered, of the form described in my companion application for patent for internal combustion engines, Serial Number 337,688. In addition to the row of engines in the air-foil 1a, I mount two additional engines 34 at either side of the leading edge of the vehicle and slightly back of the same, with exteriorly-mounted propellers 35 and 36 side by side in front of the leading edge of the fuselage. The exhaust of the engines 34 is passed through the connection 40 to the air-foil 1a which contains the multiple engines, and this connection may also carry back the supercharge of those engines to the engines 34 if supercharge is provided in their operation.

In the form of device shown in Figures 7 to 9, I also apply the ailerons 31 near the leading edge of the plane, as shown in Figure 8, but in all the forms shown in the several figures of my drawings, it is optional to place these ailerons 31 near the front, and in most instances preferable. It is also possible to place the ailerons 31 higher or lower, as indicated by comparison of Figures 5 and 9, in which the height thereof is different in each figure; and from such comparison it will also be noted that in Figure 9 the height of the fuselage is less than in the form shown in Figure 5, proportionately.

By reference to Figure 7, it will be seen that the wings 32 commence approximately where the compression-chamber 2 has diminished toward the level of the flat floor 4 of the vehicle, and that the lower surfaces of the said wings as shown in dotted lines, lie along the lines of this junction of the concaved under surface with the floor 4. In devising an operative plane which is given the powerful cushion and lift which my invention provides, I have constructed the various features and factors of my invention to cooperate therewith and with one another. In so doing, I arrange the size and shape of the wing-sections 32 to embody a distinctly low aspect ratio of width to chord, and set these wings at a low height in relation to the fuselage and to the rear end of the compression-chamber, at a low angle of incidence relatively to that of the fuselage, and I provide these wings with narrowed rounded and curved leading edges as shown in said Figure 7, with an upward camber and rearward slope downwardly. They are affixed back of the centre of gravity of the plane, and of the centre of pressure, whether that at zero velocity or at high speed.

Since this plane may be landed at a very high incidence angle, I provide windows 19 and 20 in its nose, through the concaved compression-chamber, enabling the pilot to see better in so landing.

The pontoons 41 in time of war are usable for bombing work. In this case, I attach air-brakes 50 at each side of the fuselage, which are released by a trigger 52 under pilot or bombardier control, these brakes opening back against braces 51. By diving downward at high speed, throwing open the brakes to suddenly check the plane, the bombs are automatically discharged from the pontoons.

In the operation of my invention, referring first to the form shown in Sheet 1 of the drawings, the engines are started in the usual way, and instantly a stream of highly compressed air is ejected from the nozzle 30 diagonally downwardly, at angle away from the bottom of the vehicle, and against the surface of land, water or carrier-deck from which the plane takes off. This surface responds in two allied ways to this blast of compressed air at extremely high pressure, by first resisting the thrust with consequent cushion of compressed air lifting the plane upwardly, and second by deflecting and returning the air-blast upwardly and forwardly toward the leading edge of the plane, doubling the air-stream back upon itself under the bottom of the plane in the concaved compression-chamber, and again additionally forming an air-cushion thereunder. Meanwhile, as the plane lifts, the rearward direction and pressure thereof proceeds to both lift the floor of the vehicle and drive the body forwardly at considerable speed quickly attained. As the plane rises off the launching surface, the diagonally directed blast strikes the air between the take-off surface and the plane, and such is the force of the blast that the air at the high speed of the plane and impact of this high-pressure blast, reacts measurably as a resisting surface such as a solid would. When the bottom surface blasted is not so solid, but that portions of that surface, land or water, may be torn away by the jet and expelled rearwardly, the weight of those particles of land or water times the rearward velocity represent additional forward thrust.

A forward steadiness is imparted to the vehicle by the strong engine jet propulsion stream operating within the confines of the compression-chamber 2, and rearwardly to the level floor of the vehicle. When close to land, for example, the rear portion of the vehicle may be off the ground but at times travel on the main wheel 5, when depressed in the fluid-filled cylinder so as to contact roadway, and the roller-wheels 18, or some of them, may contact inequalities of the ground to assist in smooth traverse. When skimming over water, these factors may also contact rough water. It is always necessary that before weight can be taken on these wheels, the hull must be raised enough to elevate the tail at least, and permit the escape of air to permit effective use of the usual wheel brakes, which I do not show in the drawings, it being understood that any desired type of such may be attached. In skimming over water, the vehicle may be directed by the pilot to range low over a long stretch, rise over small surface obstacles or islands, and travel over longer intervening terrain. The vehicle, when stopped for a time, becomes a shelter, like a trailer, or a means to journey from one town or hamlet to another. Of course, the greatest speed is made by running down or up rivers or bays or coastal borders.

The employment of the jet engine and compression-chamber gives the vehicle, however, a great rearward lift which is apt to lead to differences of conditions of stability and steerage and control to those encountered in conventional planes. In my experiments to produce this invention, I have discovered various tendencies of such a plane, and the effective way to offset each and collectively all, of the same. To this end, I first place a main capacious fuel tank 6 in the tail to give ballast to the tail, and stiffen the longitudinal straight-line steadiness of the vehicle, and may also, as stated, shift fuel from this to the pontoons 41. As the fuel is consumed, higher flight is more effectively allowed, for with weight decrease, the plane flies at a lower attack angle, the centre of gravity shifts further forward, and the centre of pressure shifts concomitantly. Also during take-off from a skimming surface, the centre of pressure moves rapidly forward, and may be offset by rushing fuel forward.

Next, I employ ailerons 31, which in the form of Sheet 1, are more centred than in the form of Sheet 3 of the drawings, since in that form the wings 32 are used, and then it is better to have the forward ailerons 31 near to the leading edge. These ailerons 31 are retractable, as stated, into the body of the vehicle, being unnecessary when skimming low or on a land surface.

The large central fin 7, of course an expedient known in aerostatics, is placed at the trailing edge and immediately back of the wheel 5, being surmounted by the rudder 8. Both these factors are stabilizing, both laterally and in yaw. But in skimming, banking becomes difficult in a compression-chamber plane with powerful jet propulsion, because raising the plane on one side results in a high exit air velocity wherever the compressed air is permitted to escape, which appreciably decreases the lift at that point and may wholly negative attempts to bank. This I have discovered, and also that in such a compression-chamber plane the addition of a forward central rudder 9 as shown by me in all figures of the drawings, will cooperate with the form of rear fin and rear rudder I provide, and will, in connection with such a compression-chamber and its lift tendencies, jointly therewith render turning, especially turning without banking possible and safe. The forward fin or rudder 9, which is placed well forward high above the centre of gravity as stated, if turned, has a tendency to automatically bank the compression plane. When it is skimming, this causes air to spill out under the outer runner, thereby decreasing the total lift of the under surface, and so permitting the runner on the inside of the curve to make actual contact with the water. Since in fast skimming the tail of the vehicle is always slightly lifted, this water contact of the inside runner takes place near the nose, and an abrupt and sudden turn is thus made possible, which the pilot will watch for, and control the plane accordingly. This feature enables me to reduce the total area of both forward and rear rudders considerably compared to previous types of planes, thus likewise reducing parasite drag. Without this, the centre of gravity being high, the plane would tip outwardly on the turn.

When flying is intended, as in the form shown in Sheet 3 of the drawings, I have discovered that the combination with such a compression-chamber, of the wings 32 at the tail of the plane, with the ailerons 31 at the front, with the wing-tips 33 inclined and directed as described, the fin 7 and rudder 8, the forward rudder 9, all operate to afford the plane the stability longitudinally and laterally and in yaw, the safety and security, the ability to be steered, turned, banked and handled, under the novel conditions introduced by the devisement of the forward compression-chamber.

In lateral stability and in yaw, whether on the water or in mid-air, these several factors of my invention function in unison to meet the requirements and obstacles of surface or of height-travel. The low aspect ratio of the wings 32, the upward and outward inclination of the ailerons 31, the lower angle of incidence of the wings 32, the wing-tips 33 projecting both above and below the said wings, the dihedral angle of said tips, the tapering or incline of both their under inner and outer edges, work together to resist, for example, lateral slip, tipping, a tendency to veer or to roll, to submerge on one side when in the water, as well as in other connections.

The inclination inwards and upwards of the under surfaces of the pontoons 41, continued back into the floor of the vehicle, allow compressed air to penetrate thereunder, prevent suction of or to a surface, either in take-off or in skimming, or landing, while the outer edges of the pontoons form a seal with the water to prevent the loss or ejection of air out from under the same. At the same time, these pontoons, as well as the projections of the wing-tips 33 below the wings 32, either on the water or in the air, operate and measurably cooperate, to increase the lift, while the wings, tips and fins ensure lateral stability and stability in yaw, again in concomitant action and cooperation of said pontoons with the wing-sections, the ailerons 31, and the fins 7 and 9.

In landing, the wheel 5 being depressible in its cylinder, can raise the vehicle off the ground or other surface to permit the application of its brakes, effectively.

When the vehicle is at rest, or in motion on or close to the water, or land, or in actual travel on land upon the support of the main wheel 5 and the roller-wheels 18, my newly invented flying and skimming vehicle can be backed out of any space, or in any emergency, or sharply checked in forward impulse, and turned, by my devisement of the pivotal mounting of the jet propulsion element 1 upon the journal or shaft 28. Under the control of the pilot, this engine and its compressor, and its blast of compressed air, can at will be turned to direct that stream of air forward instead of rearward. In combat work, even in the air, this pivoting of the engine may be of considerable advantage, in evolutions in emergencies.

It will be obvious that many features of my device may be varied or modified without departing from the spirit or purpose of my invention, or its attainment of its objects, and that it embodies novel principles and elements of invention, of structure and arrangement, and I do not confine myself to any minor details of construction; yet, on the other hand, there are features and combinations of parts and elements of my invention which have been especially devised to mutually act toward certain ends, which cannot be dispensed with other than by devisement of better equivalents, and are not only important for the successful operation of my flying and skimming vehicle, but distinctly interdependent interacting essentials, intentionally, schematically interrelated.

Having thus fully described my invention, what I claim as new and of my own invention is:

1. A skimming and flying vehicle provided with a concaved compression chamber in its forward portion, open beneath its leading edge, located wholly underneath the bottom of the fuselage, deep at front and diminishing to the rear, and an engine and blower mounted in the front of said compression chamber and having its nozzle or jet end directed diagonally downward and rearward to discharge away from the bottom of the vehicle and against the take-off surface and the air beneath, in skimming and flight.

2. In a skimming and flying vehicle, the combination, with a fuselage having a compression chamber beneath its leading edge and beneath the bottom of the vehicle, of a jet propulsion device mounted in said compression chamber, provided with means therein for compressing air, gas and exhaust and ejecting it therefrom, the said jet propulsion device being open at front and rear, and having its rear end directed diagonally downward and rearward to discharge toward the take-off surface and the air beneath.

3. A skimming and flying vehicle provided with a compression chamber, beneath the same, and a jet propulsion device pivotally mounted therein, having its discharge end normally directed diagonally downward and rearward, and adapted to be turned around to direct the said discharge end forwardly for backing or other reverse or checking motion.

4. A skimming and flying vehicle provided with a concaved compression chamber at its leading edge, wholly beneath its bottom, deep at front and diminishing in height to a point toward the rear of the vehicle, being open at front and rear, open to the air beneath, flaring forwardly outwardly and flaring rearwardly outwardly, pontoons at either side of the vehicle bordering the compression chamber, and a jet propulsion device mounted in the compression chamber near its leading edge, and having its discharge end directed diagonally downward.

5. A skimming and flying vehicle provided with a forward compression chamber beneath the same, and means therein for directing a rearward blast of compressed air downwardly and rearwardly against the air or surface beneath, to establish an air cushion, a pressure lift, and speed propulsion for the vehicle; pontoons bordering the sides of the compression chamber, ailerons projecting laterally from the vehicle body near the forward portion thereof, a central fin projecting upwardly from the body to its trailing edge, a rudder mounted upon said fin, and a forward fin mounted upon the body of the vehicle away from said rudder.

6. A skimming and flying vehicle having a forward compression chamber beneath the same, at and rearward of its leading edge, descending at an incline rearwardly, a jet propulsion device mounted in said chamber, open at its front end to plain and ram-compressed air, and having its discharge end directed diagonally downwardly against the air or surface beneath, ailerons projecting laterally from the vehicle near its front portion, a central fin ranging near the rear edge of the vehicle and having a rudder mounted upon the same, the fin and rudder being both inclined upwardly rearwardly, and a forwardly located supplemental fin mounted upon the top of the vehicle higher than the rear fin.

7. A skimming and flying vehicle having a compression chamber beneath its leading edge and rearward thereof, open at said leading edge and merging at rear with the bottom of the vehicle and open to the air or surface beneath; a jet propulsion device mounted in said compression chamber with its front end open to the entry of air, and adapted to discharge a blast of compressed air, and gas exhaust, diagonally downwardly and rearwardly for pressure lift and propulsion; wings projecting laterally from the rear end of the vehicle body to the trailing edge thereof, the said wings being of low aspect ratio of width to chord of said wings, and being set rearward of the centre of gravity of the vehicle body, and rearward of its centre of pressure; and a central rear rudder at and near the trailing edge of the body.

8. A skimming and flying vehicle having a compression chamber beneath the same at its forward end, open to the air or surface beneath the vehicle; an engine mounted in said compression chamber embodying means to discharge a blast of compressed air and exhaust gas therefrom; wing-sections attached at either side of the fuselage, near the floor of the same, projecting laterally therefrom at and near the rear thereof, the said wing-sections being of low aspect ratio of width to chord of said wings, and being set rearward of the centre of gravity of the vehicle and also rearward of the centre of pressure thereof; and a rudder on said fuselage.

9. A skimming and flying vehicle having a compression chamber beneath the same at its forward end, said chamber being deep and concaved at the leading edge of the fuselage, and diminishing in height gradually toward the rear, to a junction with the floor of the vehicle, and being open at front for the entrance of simple or ram-compressed air, and open below to the air beneath the vehicle, and rearwardly flaring outwardly; an engine and compressor mounted in said compression chamber, and having its discharge of air and exhaust gas directed normally rearwardly and downwardly; ailerons forwardly located upon the fuselage at either side, wing-sections of low aspect ratio mounted upon said fuselage at and near the trailing edge thereof, rearward of the centre of gravity of the vehicle and rearward of its centre of pressure, and near the floor thereof; a central fin and rudder between said wings at the top of the vehicle, and a forward central rudder placed in a position to operate in unison with the rear fin and rudder in banking the vehicle.

10. A skimming and flying vehicle having a compression chamber at its leading edge and rearwardly thereof, open to the air in front and the air beneath and opening rearwardly under the rear floor of the vehicle; a compression engine mounted in said compression chamber with its discharge end directed rearwardly and downwardly diagonally; and a pair of wing-sections mounted and continuous with the fuselage at either side, near the rear thereof, having a common trailing edge therewith, having a low aspect ratio of width to chord, lying along the lines of the floor of the vehicle near where the compression chamber ends, and being located rearward of the centre of gravity of the vehicle, and of its centre of pressure, the said wing-sections having an angle of incidence less than the angle of incidence of the fuselage.

11. In a skimming and flying vehicle, the combination with a fuselage having a forward compression chamber and a jet propulsion device mounted therein, and propellers located on the exterior of the fuselage; of wing-sections of an angle of incidence less than that of the fuselage, projecting laterally from the rear of the vehicle and continuous therewith, the said wing-sections being set near the floor of the vehicle rearward of the centre of pressure thereof and the centre of gravity thereof; a central fin mounted upon the rear of the vehicle to its trailing edge, a rudder upon the said fin, ailerons projecting laterally from each side of the fuselage near the front thereof adjacent the outside propellers, and a central rudder mounted on the top of the fuselage forward of its centre of gravity.

12. A skimming and flying vehicle having a forward compression chamber and a jet propulsion device mounted therein, adapted to discharge a blast of compressed air and gas for a pressure lift and forward speed propulsion, pontoons on either side of said compression chamber adapted to hold bombs, and means for suddenly checking the speed of the said vehicle to let the bombs slide out of the pontoons, said means consisting of brakes mounted either side of the vehicle outside the said pontoons, adapted when released to fly back against a fixed part of the vehicle.

13. A skimming and flying vehicle having a compression chamber beneath the same, a jet propulsion device mounted therein with its discharge directed diagonally downwardly and rearwardly to supply an air cushion pressure lift and speed propulsion, wing-sections at the rear thereof, and ailerons forwardly located relatively to said wings at a higher position with a greater angle of incidence, said ailerons being mounted retractably within the sides of the vehicle.

14. A skimming and flying vehicle having a compression chamber beneath the same, open in front, and beneath the same to the air or surface below, and extending in diminished height to the rear of the vehicle, a jet propulsion device located in said compression chamber and having its discharge directed diagonally downwardly and rearwardly, pontoons on either side of and serving to form said chamber, said pontoons being tapered at their forward ends and also inclined upwardly toward the inside at their contact with said chamber, to permit the air-stream of said jet propulsion device to pass thereunder and also serving as floats and runners for the vehicle, the rear floor portion of the vehicle also being inclined to correspond therewith.

15. A skimming and flying vehicle formed of a long hollow shell provided with a flattened horizontally pointed leading edge, and a sloping floor descending therefrom to a flat approximately level floor portion at rear, and having a concaved compression chamber beneath the forward portion of the vehicle fuselage, with pontoons on either side thereof, a main wheel mounted depressibly near the rear of the vehicle and adapted to contact a surface below the floor of the vehicle, to elevate said floor out of contact therewith, and a series of smaller wheels upon each pontoon; and a jet propulsion device in said compression chamber.

16. A skimming and flying vehicle having a compression chamber in its forward portion beneath the same, open at front and beneath the floor of the vehicle, and leading rearwardly, a jet propulsion device in said chamber arranged to discharge its blast diagonally downwardly and rearwardly against the air or surface beneath, whereby to create a pressure lift and speed propulsion, wing-sections at rear of the vehicle and continuous therewith, set back of the centre of pressure of the vehicle and back of its centre of gravity, and having an angle of incidence less than the angle of incidence of the fuselage; and a fuel and ballast chamber in the tail of the vehicle.

17. A skimming and flying vehicle having a compression chamber thereunder, centrally of its leading edge and extending therefrom rearwardly, pontoons at either side thereof resting on the sustaining surface at rest to support the vehicle, a jet propulsion device in said chamber having its discharge end directed to deliver a blast of compressed air and gas exhaust below the fuselage; wing-sections of low aspect ratio of width to chord, at the rear of the vehicle, and near the floor, having an angle of incidence less than that of the fuselage, wing-tip-fins upon the outer edges of said wing-sections, said tips lying on about the same level as the pontoons, said wing-tip-fins being set at a steep dihedral angle, and inclined both on their inner and outer edges.

18. A skimming and flying vehicle having a concaved compression chamber at its leading edge, decreasing in depth rearwardly, open at front and below to the air or surface beneath the vehicle, flared outwardly and forwardly, and outwardly rearwardly at its rear end, and merging with the floor of the vehicle near the rear; a jet propulsion device mounted in the compression chamber and open for the entry of plain and ram compressed air, and open at the rear end or nozzle to discharge compressed air and exhaust therefrom, the said device being directed diagonally downwardly and rearwardly to deliver its blast away from the bottom of the vehicle and against the air and take-off surface below; pontoons on either side of the compression chamber, each inclined inwardly toward said chamber, wing-sections at rear of the vehicle continuous with the fuselage and ranging along the lines of the floor, to the trailing edge of the vehicle, said wing-sections being located back of the centre of gravity of the vehicle and back of its centre of pressure, and having an angle of incidence less than the angle of incidence of the fuselage, wing-tips set on the outer edges of the wing-sections at a steep dihedral angle, and tapered or inclined on their inner and outer edges, and lying at about the same level as the pontoons; an elevating wheel depressible near the rear of the vehicle, a central vertical fin at and near the trailing edge of the vehicle, a rudder mounted thereon, a forward rudder at a higher altitude than the rear central fin, and ailerons on either side of the fuselage, forwardly of the wings and forwardly of its centre of gravity.

DOUGLAS K. WARNER.